UNITED STATES PATENT OFFICE.

GEORGE PERCY BICKFORD-SMITH, OF HELSTONE, ENGLAND.

COMPOSITION FOR DETONATORS.

SPECIFICATION forming part of Letters Patent No. 634,716, dated October 10, 1899.

Application filed December 15, 1898. Serial No. 699,329. (No specimens.)

*To all whom it may concern:*

Be it known that I, GEORGE PERCY BICKFORD-SMITH, manufacturer, a citizen of England, residing at Trevarno, Helstone, county of Cornwall, England, have invented a certain new and useful Improved Composition for Electrically Firing Detonators, (for which I applied for a patent in Great Britain, dated October 5, 1898, No. 20,989,) of which the following is a specification.

My invention relates to a composition constituting the charge for exploding a detonator, this charge being suited for being fired by an electric spark.

I intimately mix the following ingredients in about the stated proportions, by weight: sodium tungstate, four parts; copper precipitated, two parts; strontium nitrate, four parts; antimony sulphide, ninety-six parts; silver precipitated, one hundred and eight parts; potassium chlorate, one hundred and ninety-two parts; electrotype plumbago, twenty parts. This composition being placed in any suitable casing in contact with the exposed ends of a pair of wires can be fired by an electric spark between the wires, causing explosion of fulminate or other detonating charge contained in the casing.

Having thus particularly described and ascertained the nature of this invention and the best means I know of carrying the same into practical effect, I claim—

The composition of matter for detonators, consisting of sodium tungstate, precipitated copper, strontium nitrate, antimony sulphide, precipitated silver, potassium chlorate and electrotype plumbago; substantially as described.

In testimony whereof I have hereunto set my hand in presence of two subscribing witnesses.

G. PERCY BICKFORD-SMITH.

Witnesses:
 JOHN CHARLES MILLS,
 JAMES OHVEY.